Jan. 21, 1930.  J. L. DRAKE  1,744,372
METHOD AND APPARATUS FOR PRODUCING PLATE GLASS
Filed Jan. 14, 1927  2 Sheets-Sheet 1
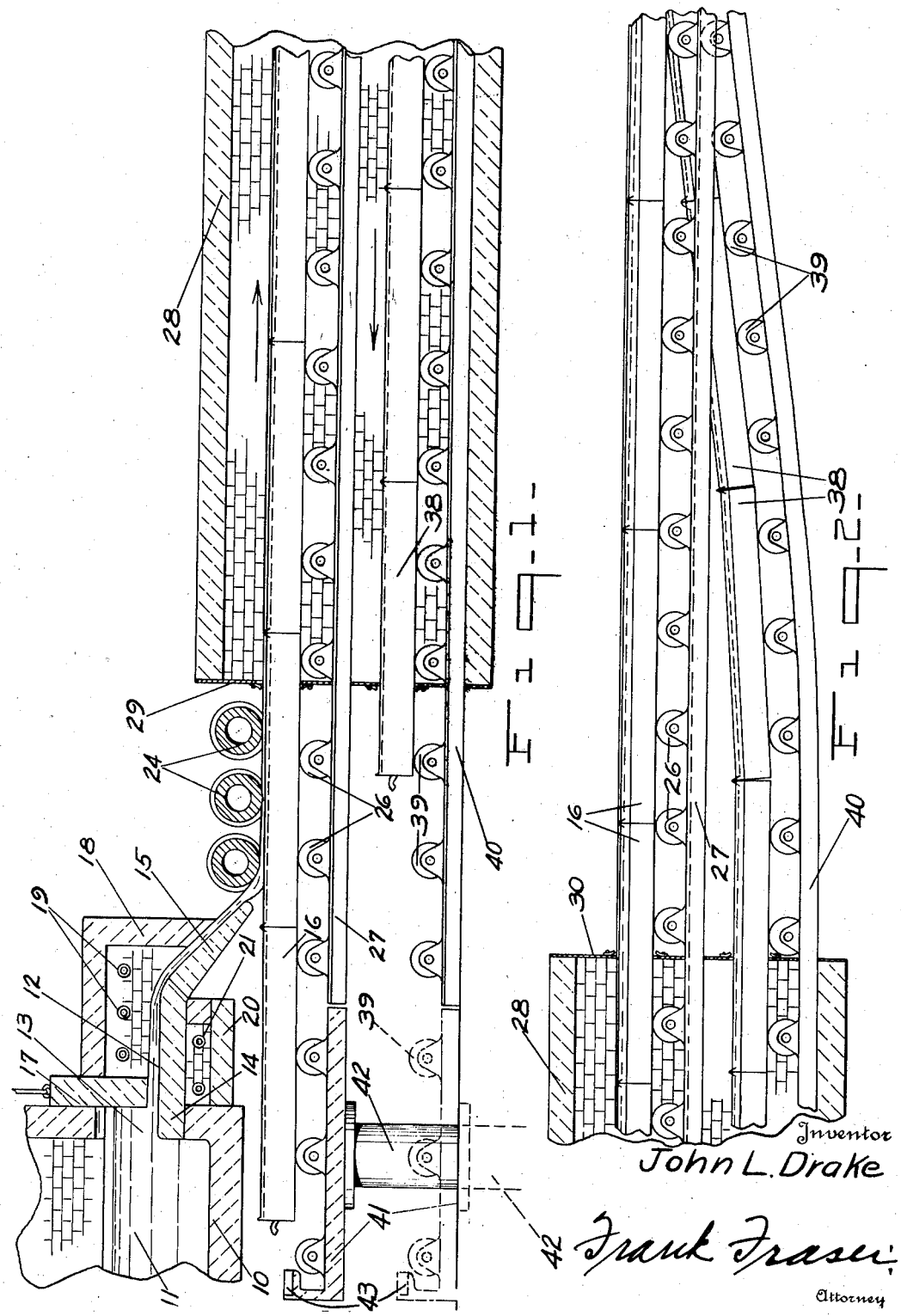
Inventor
John L. Drake
Frank Fraser
Attorney

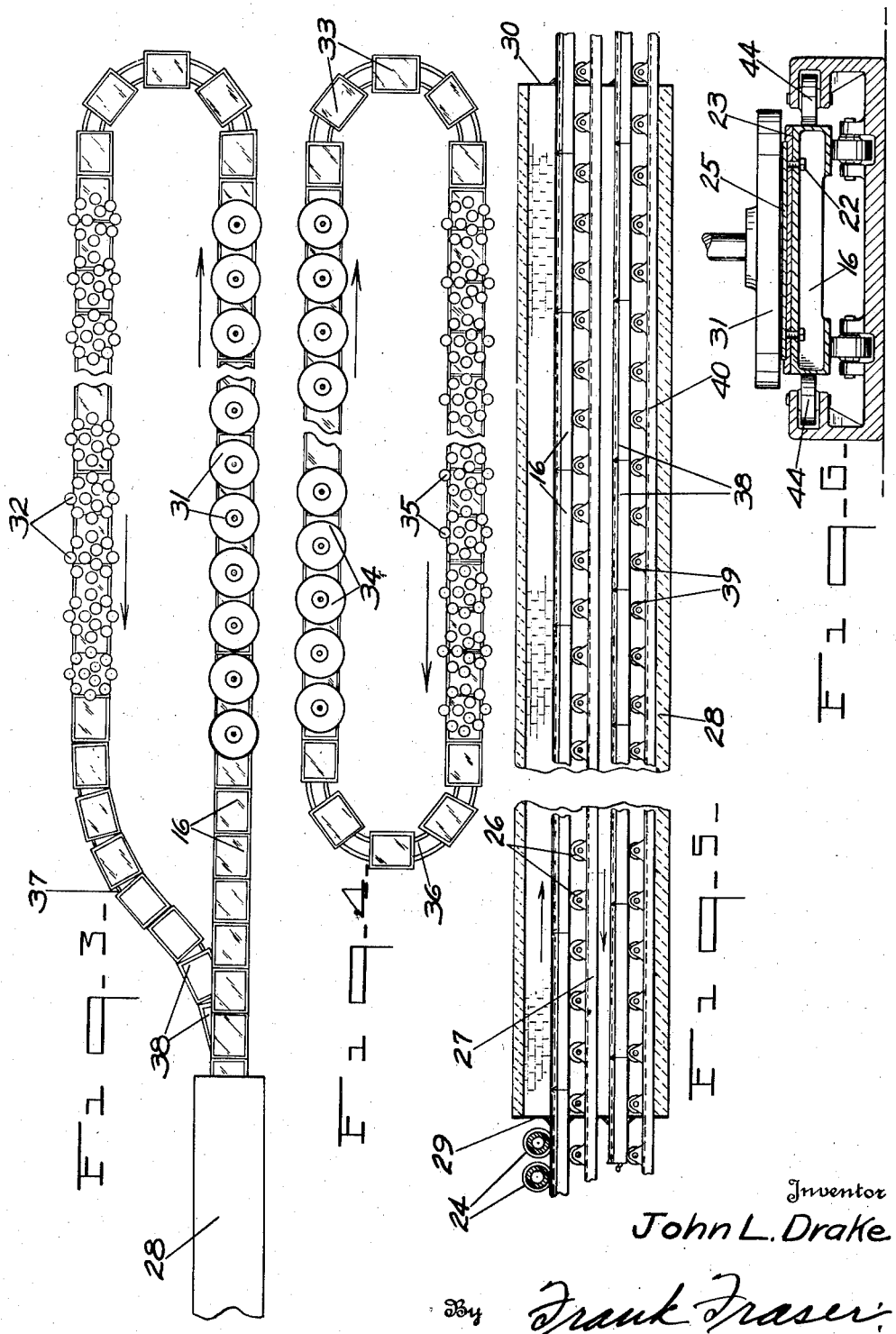

Patented Jan. 21, 1930

1,744,372

UNITED STATES PATENT OFFICE

JOHN L. DRAKE, OF TOLEDO, OHIO, ASSIGNOR TO LIBBEY-OWENS GLASS COMPANY, OF TOLEDO, OHIO, A CORPORATION OF OHIO

METHOD AND APPARATUS FOR PRODUCING PLATE GLASS

Application filed January 14, 1927. Serial No. 161,040.

The present invention relates to an improved method and apparatus for producing plate glass.

An important object of this invention is the provision of an improved method and apparatus tending to facilitate, expedite and improve generally the manufacture of plate glass.

Another object of the invention is to provide such a method and apparatus wherein the forming of the glass blanks, annealing and subsequent surfacing thereof may be accomplished in an easy and convenient manner tending to reduce to a minimum the number of glass handling operations required.

Another object of the invention is to provide such a method and apparatus of the above described character wherein the forming of the glass blanks upon the forming tables together with the annealing and subsequent grinding and polishing of one surface of said blanks may be performed without removing the glass from the forming tables.

A further object of the invention is the provision of apparatus for pre-heating the glass receiving tables prior to the forming of the glass blanks thereon.

A still further object of the invention is to provide, means for progressively cooling and then heating a series of glass supporting tables in a manner that the heat radiated from the tables being cooled will be utilized for heating the cooled tables and whereby the cooled tables absorbing the heat from the heated tables will serve to cool the same.

Still another object of the invention is to provide a plurality of movable tables on which are formed a series of glass blanks, and means for progressively cooling and then heating said tables, one surface of the blank being ground and polished and the said blank being removed from the tables after the cooling but prior to the heating thereof.

Other objects and advantages of the invention will become more apparent during the course of the following description when taken in connection with the accompanying drawings.

In the drawings forming a part of this application and wherein like numerals are employed to designate like parts throughout the same, Fig. 1 is a vertical longitudinal section through a portion of the improved apparatus constructed in accordance with the present invention.

Fig. 2 is a similar view through another portion of the improved apparatus.

Fig. 3 is a top plan view of the installation for grinding and polishing one surface of the glass.

Fig. 4 is a similar view of the means for grinding and polishing the opposite surface of the glass.

Fig. 5 is a vertical longitudinal section through the annealing leer showing the manner of routing the tables whereby to progressively cool and then heat the same, and Fig. 6 is a transverse section through one of the tables showing the manner in which it is supported beneath the grinding and polishing machines.

Heretofore, in certain processes, plate glass has been produced by forming a glass blank upon a movable table or truck after which the blank thus formed has been ground and polished to give a sheet of glass suitable for plate glass use. In order that such a process might be most satisfactorily carried out, it is desirable that the tables upon which the glass blanks are formed be heated prior to the contact of the glass therewith and preferably, that the surface of the table with which the glass contacts be of a temperature as close as possible to the temperature of the glass. The pre-heating of the tables is made possible in the present invention by employing an apparatus such as is shown in the drawings, and this invention further embodies apparatus for forming a series of glass blanks upon a plurality of movable tables, annealing and cooling the blanks and grinding and polishing one surface thereof without removing the blanks from the said movable tables.

In the drawings, the numeral 10 designates the discharge end of a suitable tank surface within which the batch or glass producing materials have been melted and conditioned to form the mass of molten glass 11. The molten glass is adapted to flow in a continuous stream 12 through the discharge opening 13 in tank 10 over a substantially horizontal flow block 14 and subsequently down an inclined slab 15 onto the moving tables 16. The discharge opening 13 of the tank 10 is controlled by a shear cake 17.

Arranged in advance of the discharge opening 13 and surrounding the stream of molten glass 12 is a chamber 18 which can be provided with either a plurality of burners or coolers 19 for controlling the temperature of the molten stream 12 as it flows from tank 10 while an auxiliary heating chamber 20 provided with burners 21 is arranged beneath the flow block 14 for controlling the temperature thereof.

Each of the tables 16 is constructed of a suitable metal and has secured to the upper surface thereof by means of screws or the like 22 as in Fig. 6, a recessed plate 23 preferably formed of platinite or some other suitable alloy having relatively the same coefficient of expansion as that of glass. As the stream of molten glass 12 is flowed onto the table 16, it is rolled in the recess in plate 23 by means of the rollers 24 to form a glass blank 25. The tables 16 are mounted upon rollers 26 carried by a runway 27, and are moved in a definite horizontal path through the annealing leer 28, entering the end 29 and leaving the end 30 thereof. After the glass blanks 25 have been formed on the tables 16, they are carried through the leer 28, where they are gradually reduced to room temperature as is well known in the art and it will be evident that as the glass is annealed, the tables 16 will be also cooled.

After the tables 16 emerge from end 30 of leer 28, they are progressively passed beneath a series of grinding machines 31 after which their path of travel is reversed and they are passed beneath a series of polishing machines 32, whereby to complete the surfacing of one side of the glass blanks. The glass blanks are then removed from the tables 16, turned over, and placed upon a second line of tables 33 having felt or cork covered recesses. The glass blanks are then passed beneath a second series of grinding and polishing machines 34 and 35 respectively in order to surface the second side thereof, the blanks being then removed from the tables 33 at substantially the point indicated at 36.

The removal of the sheets or blanks 25 from the tables 16 takes place at substantially the point indicated by the numeral 37 and the empty trucks or tables 38 are then passed back through the leer 28 in the direction opposite to the movement of the loaded tables 16, entering the end 30 and leaving end 29 thereof. The empty and cooled tables 38 being returned through the leer are carried along upon a second series of supporting rollers 39 carried by runway 40 and it will be noted that the return tables are carried in a definite horizontal path beneath the forwardly advancing loaded tables 16.

The empty tables 38 passing back through the annealing leer 28 cannot only be heated by such extraneous heating means as might be employed but will also be heated by the heat which is being radiated from the loaded tables 16 which are being cooled and the cooled empty tables absorbing this heat from the hot tables will serve to cool the same.

As the empty tables 38 emerge from the end 29 of leer 28 they are run onto a vertically movable platform 41 and individually moved or raised to the level of the tables 16 by means of a suitable lifting device 42, a bumper 43 serving to limit rearward movement of the tables 38 on the platform 41. Guide rollers 44 are adapted to bear against the side portions of the tables when they are under the grinding and polishing machines whereby to prevent lateral movement thereof.

From the above it will be seen that there has not only been provided means for preheating the tables prior to the forming of the glass blanks thereon but that there has also been provided apparatus for forming a series of glass blanks upon a plurality of movable tables composed of a metallic substance having relatively the same coefficient of expansion as that of glass, annealing and cooling the blanks and grinding and polishing one surface thereof without removing the blanks from said movable tables.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

Claims:

1. In apparatus for producing plate glass, a plurality of movable tables, means for forming a series of glass blanks thereon, an annealing leer, means for carrying the tables in one direction through said leer to anneal said blanks and cool said tables, means for carrying said tables in the opposite direction back through said leer whereby to heat the same prior to the forming of another series of blanks thereon, and means for grinding and polishing one surface of the glass blanks after the cooling but prior to the heating of said tables and without removing the said blanks therefrom.

2. In apparatus for producing plate glass, a plurality of movable tables, means for forming a series of glass blanks thereon, an annealing leer, means for carrying the tables in one direction through said leer to anneal said blanks and cool said tables, means for carrying said tables in the opposite direction back through said leer in such a manner that the heat radiated from the tables being cooled will be utilized for heating the cooled tables, and means for surfacing one side of the glass blanks after the cooling but prior to the heating of said tables.

3. In apparatus for producing plate glass, a plurality of movable tables, means for forming a series of glass blanks thereon, an annealing leer, means for carrying the tables in a horizontal path through said leer to anneal said blanks and cool said tables, means for carrying said tables in a second horizontal path back through said leer whereby to heat the same prior to the forming of another series of blanks thereon, and means for surfacing one side of the glass blanks after the cooling but prior to the heating of said tables and without removing the blanks therefrom.

4. In apparatus for producing plate glass, a plurality of movable tables on which a series of glass blanks are formed, means for annealing the blanks, and means for subsequently grinding and polishing one surface of said blanks without removing the same from said movable tables.

5. In apparatus for producing plate glass, a plurality of movable tables, means for forming a series of glass blanks thereon, an annealing leer, means for carrying the tables in a horizontal path through said leer to anneal said blanks and cool said tables, means for subsequently surfacing one side of said blanks prior to the removing of the same from said tables, means for carrying said tables back through said leer in a second horizontal path whereby to heat said tables prior to the forming of another series of blanks thereon, and means for shifting the heated tables into a position in alignment with the tables being cooled.

6. In apparatus for producing plate glass, a plurality of movable tables on which a series of glass blanks are formed, means for annealing said blanks and cooling said tables, means for grinding and polishing one surface of the blanks after the annealing thereof and before removing the same from the movable tables, and means for heating said movable tables after the blanks have been removed therefrom.

7. In apparatus for producing plate glass, a plurality of movable tables on which are formed a series of glass blanks, means for progressively cooling and then heating said tables, and means for surfacing one side of said blanks after the cooling but prior to the heating of said tables without removing the blanks therefrom.

8. In apparatus for producing plate glass, a plurality of movable tables on which are formed a series of glass blanks, an annealing leer for progressively cooling and then heating said tables in such a manner that the heat radiated from the tables being cooled will be utilized to heat the cooled tables, and means for surfacing one side of the glass blanks after the cooling but prior to the heating of said tables without removing the blanks therefrom.

9. In apparatus for producing plate glass, a plurality of movable tables on which a series of glass blanks are formed, means for simultaneously cooling and heating two series of tables moving in opposite directions in two different horizontal paths, and means for grinding and polishing one surface of the blanks after the cooling but prior to the heating of said tables and without removing the blanks therefrom.

10. In apparatus for producing plate glass, a plurality of movable tables composed of a material having substantially the same coefficient of expansion as that of glass and on which a series of glass blanks are formed, means for annealing the blanks, and means for subsequently grinding and polishing one surface thereof without removing the same from said movable tables.

11. In apparatus for producing plate glass, a plurality of movable tables, means for forming a series of glass blanks thereon, that portion of each table with which the glass contacts having substantially the same coefficient of expansion as the glass, means for annealing said blanks, and means for subsequently grinding and polishing one surface thereof without removing the same from said movable tables.

12. The method of producing plate glass which consists in forming a glass blank upon a movable table, simultaneously annealing said blank and cooling said table, surfacing one side of said blank, removing said blank from the table and subsequently heating said table.

13. The method of producing plate glass which consists in forming a glass blank upon a movable table, progressively cooling and then heating the table, and surfacing one side of the blank after the cooling of the table but prior to the heating thereof and without removing said blank from said table.

14. The method of producing plate glass which consists in forming a series of glass blanks upon a plurality of movable tables, progressively cooling and then heating the tables in such a manner that the heat radiated from the tables being cooled will be utilized for heating the cooled table, and surfacing one side of the blanks after the cooling but prior to the heating of said tables and without removing the blanks from said movable tables.

15. The method of producing plate glass which consists in forming a glass blank upon a movable table, annealing the said blank, and then grinding and polishing one side thereof without removing the same from said movable table.

16. The method of producing plate glass, which consists in forming a glass blank upon a table, annealing the blank and then surfacing one side thereof subsequent to annealing without removing the same from said table.

17. The method of producing plate glass, which consists in forming a glass blank upon a table, annealing the blank, then surfacing one side of the blank while on said table after which the blank is removed therefrom, and heating the table subsequent to the removal of the blank therefrom and prior to contact of other glass therewith.

18. The method of producing plate glass, which consists in forming a glass blank upon a table, passing the table and blank through an annealing chamber to anneal said blank, then surfacing one side of the blank while on said table, removing the partially surfaced blank from the table, and passing the table back through the annealing chamber in an upright position to heat the same prior to the contact of other glass therewith.

19. In apparatus for producing plate glass, a table, means for forming a glass blank thereon, an annealing chamber through which the table and blank are adapted to be passed to anneal said blank, and means for surfacing one side of the blank while on said table and subsequent to the annealing thereof.

20. In apparatus for producing plate glass, a table, means for forming a glass blank thereon, an annealing leer through which the table and blank are adapted to be passed to anneal said blank, means for subsequently surfacing one side of the blank while on said table after which said blank is removed therefrom, and means for passing the empty table back through said leer to heat the same prior to the contact of other glass therewith.

21. In apparatus for producing plate glass, a table, means for forming a glass blank thereon, an annealing leer through which the table and blank are adapted to be passed to anneal said blank, means for subsequently surfacing one side of the blank while on said table after which said blank is removed therefrom, and means for re-routing the empty table back through said leer in an upright position.

Signed at Toledo, in the county of Lucas and State of Ohio, this 12th day of January, 1927.

JOHN L. DRAKE.